United States Patent
Kaski et al.

(10) Patent No.: US 7,194,727 B2
(45) Date of Patent: Mar. 20, 2007

(54) MANAGING COMPOSITE OBJECTS IN A NETWORK

(75) Inventors: Jyrki Kaski, Tampere (FI); Uwe Geuder, Tampere (FI); Otso Auterinen, Helsinki (FI); Esa Nurmi, Tampere (FI); Stefan Zohren, Wegberg (DE)

(73) Assignee: Nokia Corporation, Espoo (FI)

( * ) Notice: Subject to any disclaimer, the term of this patent is extended or adjusted under 35 U.S.C. 154(b) by 769 days.

(21) Appl. No.: 10/329,926

(22) Filed: Dec. 27, 2002

(65) Prior Publication Data

US 2003/0140127 A1 Jul. 24, 2003

(51) Int. Cl.
*G06F 9/44* (2006.01)

(52) U.S. Cl. ...................................................... 717/104

(58) Field of Classification Search ................ 717/104, 717/108, 116, 122, 170, 171, 153; 707/101–103
See application file for complete search history.

(56) References Cited

U.S. PATENT DOCUMENTS

| | | | | |
|---|---|---|---|---|
| 5,339,438 A | * | 8/1994 | Conner et al. | 717/153 |
| 5,499,365 A | * | 3/1996 | Anderson et al. | 707/203 |
| 5,774,723 A | * | 6/1998 | Endicott et al. | 717/108 |
| 6,011,917 A | * | 1/2000 | Leymann et al. | 717/104 |
| 6,654,029 B1 | * | 11/2003 | Chiu et al. | 715/717 |
| 6,694,328 B1 | * | 2/2004 | Bennett | 707/103 R |
| 6,868,425 B1 | * | 3/2005 | Bergstraesser et al. | 707/103 R |
| 6,922,724 B1 | * | 7/2005 | Freeman et al. | 709/223 |
| 6,947,571 B1 | * | 9/2005 | Rhoads et al. | 382/100 |
| 7,010,795 B2 | * | 3/2006 | Couturier et al. | 719/318 |
| 2001/0048728 A1 | * | 12/2001 | Peng | 375/354 |
| 2003/0135586 A1 | * | 7/2003 | Minborg et al. | 709/219 |
| 2004/0055005 A1 | * | 3/2004 | Creswell et al. | 719/315 |

FOREIGN PATENT DOCUMENTS

| | | |
|---|---|---|
| EP | 0 483 039 A2 | 4/1992 |
| GB | 2 344 019 A | 5/2000 |
| GB | 2 344 963 A | 6/2000 |
| WO | WO 97/22213 | 6/1997 |
| WO | WO97/24837 | 7/1997 |
| WO | WO 99/62273 | 12/1999 |

OTHER PUBLICATIONS

Sally Floyd, et al. "Link-sharing and resource management models for packet networks", Aug. 1995, IEEE/ACM Transactions on Networking (TOM), vol. 3 Issue 4, IEEE Press.*

(Continued)

Primary Examiner—Wei Zhen
Assistant Examiner—Anna Deng
(74) Attorney, Agent, or Firm—Squire, Sanders & Dempsey L.L.P.

(57) ABSTRACT

A software object model for modeling (resource instances and resource types in a network management system. The model comprises object instances and object classes. Each class comprises fragments of data and/or program code and is a generalization of one or more object instances. The model models each resource type by an object class and assigns to the class a class version identifier which indicates at least some capabilities of the resource instance/types and a collection of the fragments included in the class of the version in question. The model further models each resource instance by an object instance of the corresponding class, and assigns to the instance an object instance identifier and an instance version identifier which indicate the version of the class used for modeling the resource type in question.

12 Claims, 2 Drawing Sheets

OTHER PUBLICATIONS

N.G. Duffield, et al. "A Flexible Model for Resource Management in Virtual Private Networks", Aug. 1999, ACM SIGCOMM vol. 29 Issue 4, ACM Press.*

Lawrence L. Rose, "A Resource Model For Networked Processes", 1982,, Proceedings of the 15th annual symposium on simulation, pp. 211-221, IEEE Computer Society Press.*

Concepts and methods for version modeling, Oussalah et , pp. 332-337, Sep. 20-24, 1993.

Ensuring Management Systems Interoperability Through Out an Operational Object Model Designing, Sibilla et al, pp. 1004-1009, vol. 2, Dec. 6-9, 1992.

* cited by examiner

MANAGING COMPOSITE OBJECTS IN A NETWORK

BACKGROUND OF THE INVENTION

The invention relates to methods and equipment for managing composite objects in a data processing system for a telecommunication network, such as in a telephone exchange.

Network management standards are nowadays largely based on object-oriented descriptions, though the prevailing standards do not require the use of this technique. Objects are data structures in a network management system, which describe the functions and state of a network component. An object is an element having certain attributes ("I am like this") and certain operations ("I can do these things"). In the object-oriented approach, objects with the same data structure (attributes) and the same behaviour (operations) are grouped into a class. A specific implementation of an operation is called a method and each object is said to be an instance of its class. A typical object is, for example, a representation of a cross-connection device with certain attributes (cross-connections that are active) and certain methods (e.g. make a cross-connection and release a cross-connection). An example of object-based network management is disclosed in co-assigned patent application WO97/24837, which is incorporated herein by reference.

A 'physical resource' (of a network) is a tangible resource, such as a cable, port, channel. A 'logical resource' is typically a physical resource with some enhancements or added value, such as a cable group which is an arbitrary combination of cables, or a path which is a route across a network, utilising cables, ports and channels. However, the distinction between physical and logical resources is not essential for understanding or implementing the invention. They both belong to the category of real resources (or simply 'resources'), as distinct from software classes (of software objects), which are used for modelling real (i.e. physical or logical) resource types. A resource type represents a set or group of substantially similar network resources, such as circuits or ports. A resource instance is an individual instantiation of a resource type, for example 'circuit 1234' or 'port 2-21'. A software object is an instance of an object class.

A managed or manageable object (MO) refers to a software presentation of a network resource which is capable of sending notifications or measurements and/or which must be configured from a network management system (NMS).

Managed objects are typically implemented in several subsystems, such as:

in the network element (NE) proper;
on the element management layer (EML) of the network management system (NMS);
in a regional subsystem of the network management layer (NML) of the NMS;
in a network-wide subsystem of the NML of the NMS;
in the service management layer (SML) of the NMS;
in one or more planning systems.

The above list is for illustration rather than limitation; there may be other subsystems where manageable objects are stored, and some of these subsystems may not be present in every telecommunications system.

There are valid reasons in favour of storing a separate realization of an MO in each of these subsystems. For example, these subsystems operate on different aspects of a given MO. Especially when a new subsystem is being constructed, aspects relating to other subsystems are not known (yet). In addition, telecommunication systems have high availability requirements which are difficult to meet by a single realization accessed over data communication links.

A problem with the prior art object-management mechanism is that implementing, operating and maintaining multiple realizations of a single MO is resource-consuming and error-prone.

DISCLOSURE OF THE INVENTION

An object of the invention is to provide a mechanism for eliminating, or at least mitigating the above problem. This object is achieved with a method and equipment which are characterized by what is disclosed in the attached independent claims. Preferred embodiments of the invention are disclosed in the attached dependent claims.

According to one aspect of the invention, there is provided a method for modelling a plurality of resources in a network management system. The resources comprise resource instances and resource types such that each resource type is a generalization of one or more resource instances. The method comprises forming a software object model which comprises object instances and object classes, wherein each object class comprises fragments of data and/or program code and is a generalization of one or more object instances, each instance inheriting the capabilities of the corresponding class. Each resource type is modelled by a software object class, and a class version identifier is assigned to the object class. The class version identifier directly or indirectly indicates:

(a) at least some capabilities of the resource; and
(b) a collection of the fragments included in the object class of the version in question.

Each resource instance is modelled by an object instance of the corresponding class. The method further comprises assigning to the object instance an object instance identifier and an instance version identifier which directly or indirectly indicate the version of the class which is used for modelling the real resource type in question.

An advantage of the invention as defined above is that it lays a software foundation for the embodiments defined by the dependent claims. Another advantage is that the invention enables a network operator to change, add or delete code/data fragments dynamically (at run-time). When fragments are changed, added or deleted, the object class version is changed. Each object class version preferably implements all the features of an older version. Since the objects retain their instance versions, it is possible to perform an object instance version inquiry. Based on the results of this inquiry, it is possible to use an appropriate interface (collection of fragments) to the object in question. A benefit of this approach is that it reduces the amount of required software to manage network elements of many different versions.

According to a preferred embodiment of the invention, each MO is implemented as one single composite object which is accessible to all subsystems by means of distributed object technology. An advantage of this embodiment is that the number of different versions and implementations of an MO is reduced.

According to another preferred embodiment of the invention, each object class version implements all the features of the objects with the same object identifier but with an older version identifier. An advantage of this embodiment is that the system is backwards-compatible.

BRIEF DESCRIPTION OF THE DRAWINGS

The invention will be described in more detail by means of preferred embodiments with reference to the appended drawings, in which.

DETAILED DESCRIPTION OF THE INVENTION

Figure 1:
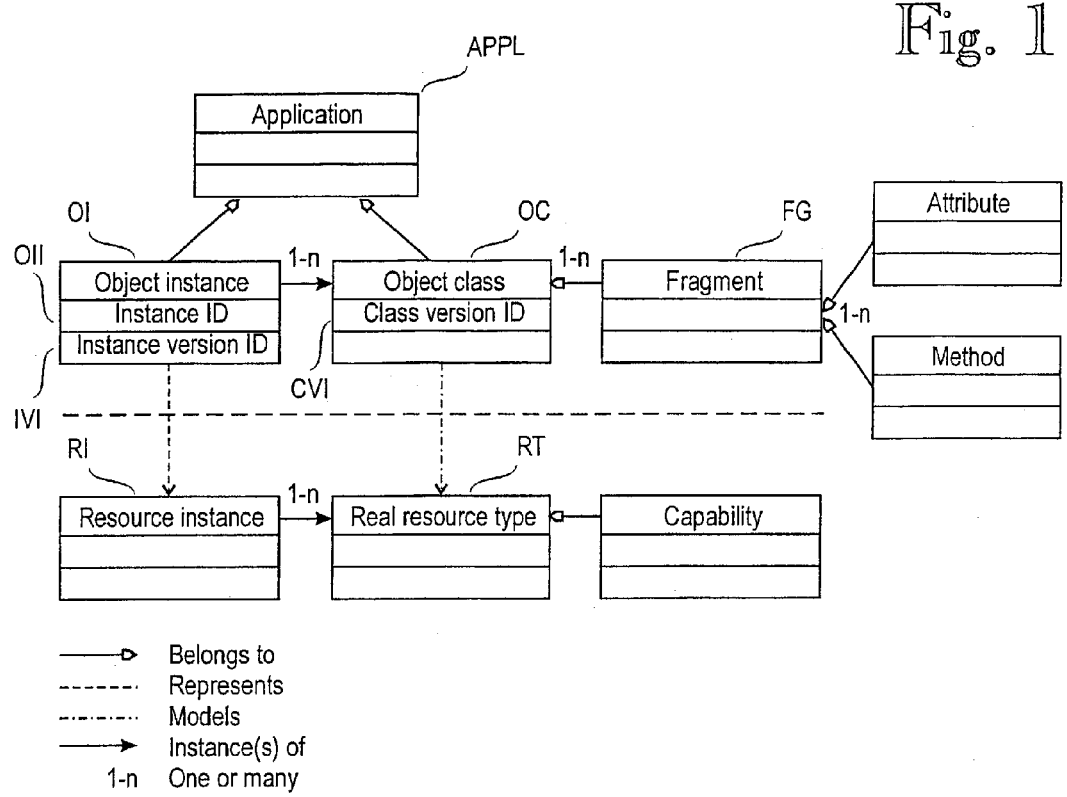
FIG. 1 is a block diagram which illustrates a method according to the invention for modelling real resources with software objects.

FIG. 1 illustrates modelling real resources with software objects. A horizontal dashed line separates a software model according to the invention from real world resources. A software application APPL utilizes (software) object classes. Each real (physical or logical) resource type RT is modelled by a separate object class OC. The class is provided with a class version identifier CVI which directly or indirectly indicates the capabilities of the real resource type being modelled. This means that the capabilities (the attributes and methods) of a resource type are modelled by an object class. A class is instantiated as a resource type is instantiated. Each real resource instance RI is modelled by a software object instance OI of the corresponding class. The software object instance is provided with a unique object instance identifier OII. Additionally, it is provided with an object instance version identifier IVI, which directly or indirectly indicates the model class version which must be used to model the corresponding real resource. Software objects (classes and instances), which are used to model real resources, consist of fragments FG of data and program code. The class version identifier CVI directly or indirectly indicates a collection of fragments included in each particular version of the software object. When changes are needed for the modelling of a real resource, new fragments of program code and/or data are added to the software object class, and the class version identifier CVI is changed to represent the new collection of fragments. When a software object is instantiated (generated), the correct version of the model is selected by using the object instance version identifier OVI.

Figure 2:
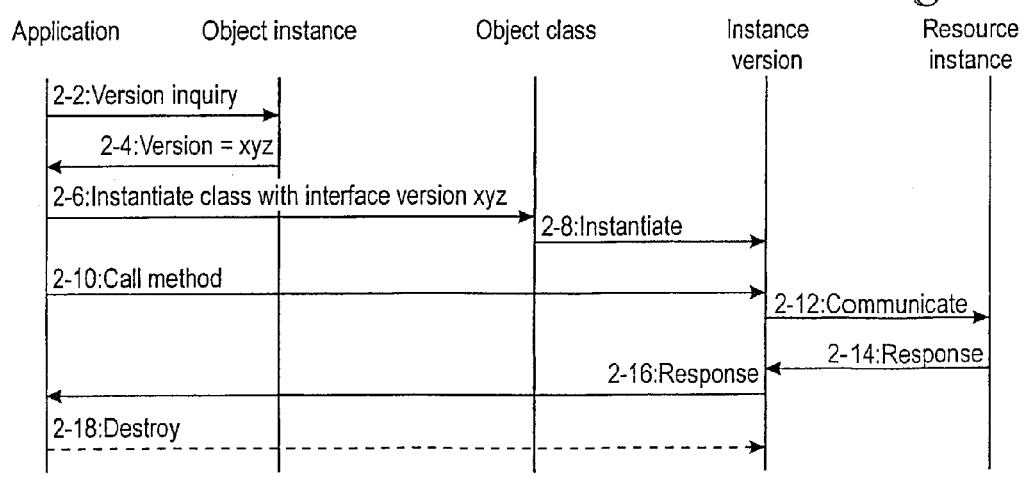
FIG. 2 is a signalling diagram illustrating a possible set of events in a telecommunication network according to the invention.

FIG. 2 is a signalling diagram illustrating a possible set of events in a telecommunication network according to the invention. Let us assume that a software application needs to use an object instance OI of a given version. In step 2-2, the application sends the object instance a version inquiry. In step 2-4, the object instance returns its version number xyz. In step 2-6, the application requests the corresponding object class to instantiate an object with an interface of this particular version. In step 2-8, the object class instantiates such an object instance. In step 2-10, the application uses the object instance by sending a procedure call. In step 2-12, the object instance communicates with the real resource instance which returns a response in step 2-14. The response is returned to the application in step 2-16. In step 2-18, the application deletes the object instance.

An essential difference between telecommunication systems and stand-alone computer systems is that telecommunication systems cannot be shut down for adding new fragments. This is why new fragments must be implemented so that they can be incorporated in a software object in a running network management system. This feature of the invention is illustrated in FIGS. 3 and 4, of which the former illustrates a prior art mechanism for managing objects in a network management system and the latter illustrates a mechanism according to a preferred embodiment of the invention.

Figure 3:
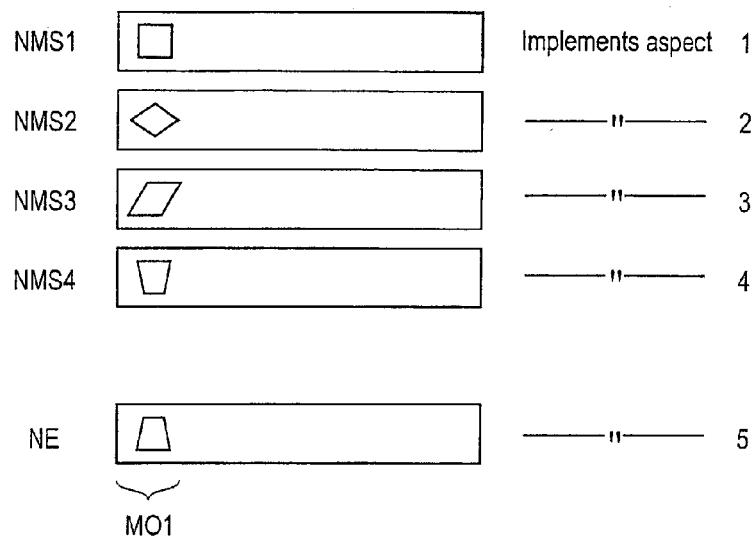
FIG. 3 illustrates a prior art mechanism of managing manageable objects.

FIG. 3 shows a prior art mechanism for storing managed objects in various network management systems NMS1 to NMS4 and in various network elements NE. An example of a network element is a telephone exchange. For clarity, FIG. 3 shows only one managed object MO1. Each network management system NMS1 to NMS4 and the network element NE stores a different version of the managed object MO1, as illustrated by the different shapes of the quadrangle.

Figure 4:
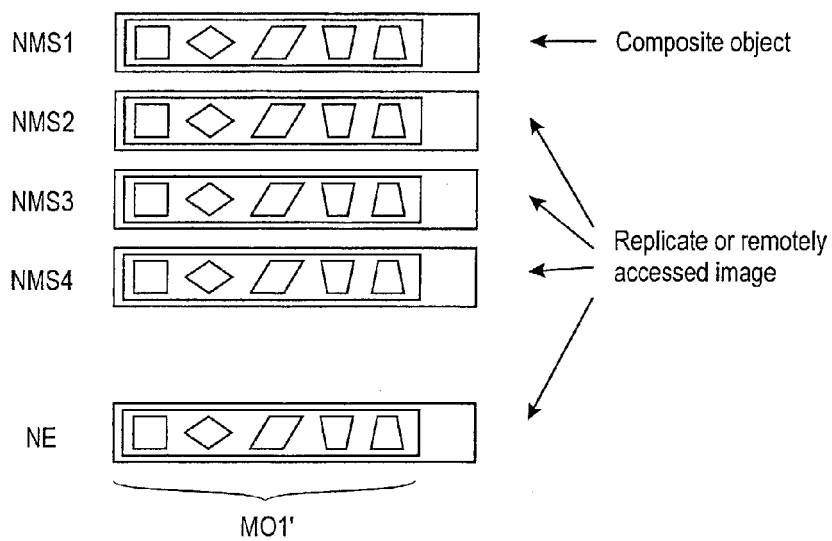
FIG. 4 illustrates an object-managing mechanism according to the invention.

FIG. 4 shows a mechanism according to a preferred embodiment of the invention. Now each managed object is implemented as one single composite object. Again, FIG. 4 shows only one managed composite object MO1'. By means of distributed object technology, the object MO1' is accessible to all subsystems NMS1 to NMS4 and network elements NE which need access to any aspect of the managed object. In order to maintain high availability, the composite object MO1' can be replicated component-wise or as a whole to one or more additional subsystems. During the lifetime of the composite object, more composite objects can be added and old composite objects can be deleted and/or replaced by enhanced versions of the same composite object. Composite objects may (but do not have to) reflect the different aspects of the MO needed by different management systems.

Although the invention has been described in connection with network management systems, it is not limited to these examples, but it can be used in virtually all digital data processing systems, such as process automation and the like.

We claim:

1. A network resource modeling method comprising:
modeling a plurality of network resources in a network management system, said network resources comprising network resource instances and network resource types such that each network resource type is a generalization of one or more network resource instances;
forming a software object model, the model comprising object instances and object classes, wherein each object class comprises fragments of data and/or program code and is a generalization of one or more object instances, each instance inheriting the capabilities of the corresponding class;
modeling each network resource type by a software object class, and assigning to said object class a class version identifier which directly or indirectly indicates:
(a) at least some capabilities of the network resource; and
(b) a collection of the fragments included in the object class of the version in question; and
modeling each network resource instance by an object instance of the corresponding class, and assigning to said object instance an object instance identifier and an instance version identifier which directly or indirectly indicate the version of the class which is used for modeling the network resource type in question.

2. The method according to claim 1, further comprising modeling at least some objects as composite objects which implement the capabilities of all versions of the network resource type in question.

3. The method according to claim 1, wherein each object class version implements all the features of the objects with the same object identifier but with an older version identifier.

4. The method according to claim 1, further comprising:
sending a version inquiry from a software application to an object instance to obtain an instance version identifier;
sending an instantiate command from the software application to an object class, the command including the instance version identifier obtained in the previous step;
instantiating the object class to obtain an object instance of a version indicated by the instance version identifier.

5. The method according to claim 1, wherein the network is a telecommunication network.

6. A computer program embodied on a computer-readable medium, the computer program comprising code means to perform:
forming a software object model, the model comprising object instances and object classes, wherein each object class comprises fragments of data and/or program code and is a generalization of one or more object instances, each instance inheriting the capabilities of the corresponding class;
modeling each resource type by a software object class, and assigning to said object class a class version identifier which directly or indirectly indicates:
(a) at least some capabilities of the resource; and
(b) a collection of the fragments included in the object class of the version in question; and
modeling each resource instance by an object instance of the corresponding class, and assigning to said object instance an object instance identifier and an instance version identifier which directly or indirectly indicate the version of the class which is used for modeling the resource type in question.

7. The computer program according to claim 6, wherein the computer program is a network management program of a telecommunication network.

8. A computer program product embodied on a computer-readable medium, the computer program product comprising a software object model for modeling a plurality of resources in a network management system, said resources comprising resource instances and resource types such that each resource type is a generalization of one or more resource instances,
the software object model comprising object instances and object classes, wherein each object class comprises fragments of data and/or program code and is a generalization of one or more object instances, each instance inheriting the capabilities of the corresponding class,
wherein the software object model comprises code portions for
modeling each resource type by a software object class, and assigns to said object class a class version identifier which directly or indirectly indicates
(a) at least some capabilities of the resource, and
(b) a collection of the fragments included in the object class of the version in question, and for
modeling each resource instance by an object instance of the corresponding class, and assigning to said object instance an object instance identifier and an instance version identifier which directly or indirectly indicate the version of the class which is used for modeling the resource type in question.

9. The computer program product according to claim 8, further comprising code portions for modeling at least some objects as composite objects which implement the capabilities of all versions of the resource type in question.

10. The computer program product according to claim 8, wherein each object class version implements all the features of the objects with the same object identifier but with an older version identifier.

11. The computer program product according to claim 8, further comprising code portions for:
sending a version inquiry from a software application to an object instance to obtain an instance version identifier;
sending an instantiate command from the software application to an object class, the command including the instance version identifier obtained in the previous step;
instantiating the object class to obtain an object instance of a version indicated by the instance version identifier.

12. The computer program product according to claim 8, wherein the network is a telecommunication network.

* * * * *

UNITED STATES PATENT AND TRADEMARK OFFICE
CERTIFICATE OF CORRECTION

PATENT NO. : 7,194,727 B2 Page 1 of 1
APPLICATION NO. : 10/329926
DATED : March 20, 2007
INVENTOR(S) : Kaski et al.

It is certified that error appears in the above-identified patent and that said Letters Patent is hereby corrected as shown below:

On the Title Page, item (63)

The Related U.S. Application Data should read as follows:

Continuation of application No. PCT/FI01/00600 filed on June 25, 2001.

On the Title Page of the Patent, Section (30) Foreign Application Priority Data is missing.

In Section (30):

The Foreign Application Priority Data should read as follows:

June 27, 2000 (FI) .......................................................20001524

Signed and Sealed this

Fifteenth Day of July, 2008

JON W. DUDAS
*Director of the United States Patent and Trademark Office*